United States Patent
Shimada

(10) Patent No.: US 11,948,746 B2
(45) Date of Patent: Apr. 2, 2024

(54) MULTILAYER CERAMIC CAPACITOR

(71) Applicant: Murata Manufacturing Co., Ltd., Nagaokakyo (JP)

(72) Inventor: Yasuyuki Shimada, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 51 days.

(21) Appl. No.: 17/833,983

(22) Filed: Jun. 7, 2022

(65) Prior Publication Data
US 2023/0016359 A1   Jan. 19, 2023

(30) Foreign Application Priority Data

Jul. 8, 2021   (JP) .................................. 2021-113266

(51) Int. Cl.
*H01G 4/012*   (2006.01)
*H01G 4/12*   (2006.01)
*H01G 4/224*   (2006.01)
*H01G 4/30*   (2006.01)
*H01G 4/008*   (2006.01)

(52) U.S. Cl.
CPC ........... *H01G 4/012* (2013.01); *H01G 4/1227* (2013.01); *H01G 4/224* (2013.01); *H01G 4/30* (2013.01); *H01G 4/0085* (2013.01)

(58) Field of Classification Search
None
See application file for complete search history.

(56) References Cited

U.S. PATENT DOCUMENTS

| 2006/0214263 A1 | 9/2006 | Kojima et al. | |
|---|---|---|---|
| 2020/0152388 A1* | 5/2020 | Jun | H01G 4/248 |
| 2021/0020378 A1* | 1/2021 | Fukuma | H01G 4/224 |
| 2021/0313113 A1* | 10/2021 | Hirao | H01G 4/1209 |
| 2022/0216008 A1* | 7/2022 | Kim | H01G 4/30 |

FOREIGN PATENT DOCUMENTS

| JP | 2005032807 A | * | 2/2005 |
|---|---|---|---|
| JP | 2006-278566 A | | 10/2006 |
| JP | 2015029008 A | * | 2/2015 |

\* cited by examiner

*Primary Examiner* — Eric W Thomas
(74) *Attorney, Agent, or Firm* — Keating & Bennett, LLP

(57) ABSTRACT

A multilayer ceramic capacitor includes a multilayer body including dielectric layers and internal electrodes alternately stacked on one another, and two external electrodes respectively on two end surfaces of the multilayer body. Each of the dielectric layers includes, at a location coincident with an end portion of a respective one of the internal electrodes, a thick-walled portion thicker in a stacking direction than a portion corresponding in position to a middle portion of a main surface of the multilayer body. When viewed in the stacking direction, positions of some of the thick-walled portions of the dielectric layers are out of alignment with positions of a remainder of the thick-walled portions of the dielectric layers.

18 Claims, 13 Drawing Sheets form of the internal electrode layer into an inclined surface and making the level-difference-absorbing layer overlap with this inclined surface.

However, from the viewpoint of accuracy of manufacture, it is difficult to accurately form the level difference-absorbing layer on the inclined surface of the internal electrode. In addition, an attempt to increase the accuracy of manufacture is expected to reduce ease of manufacture.

MULTILAYER CERAMIC CAPACITOR

CROSS REFERENCE TO RELATED APPLICATIONS

This application claims the benefit of priority to Japanese Patent Application No. 2021-113266 filed on Jul. 8, 2021. The entire contents of this application are hereby incorporated herein by reference.

BACKGROUND OF THE INVENTION

1. Field of the Invention

The present invention relates to a multilayer ceramic capacitor.

2. Description of the Related Art

A multilayer ceramic capacitor has a structure in which a multilayer body includes dielectric layers and internal electrodes alternately stacked on each other and has external electrodes respectively provided on both ends thereof (see, for example, Japanese Unexamined Patent Application Publication No. 2006-278566). Each internal electrode has an opposing portion and a lead-out portion. The opposing portion faces an opposing portion of the adjacent internal electrode in the stacking direction, and the lead-out portion extends from the opposing portion and is connected to one of the external electrodes in the longitudinal direction. Since the lead-out portions of the adjacent internal electrodes are drawn out in alternate directions, areas on both longitudinal sides of the opposing portions include a smaller number of the internal electrodes than an area where the opposing portions are located. Furthermore, no internal electrode is present in side gaps on both sides in the width direction of the opposing portions.

When the multilayer body undergoes a pressing process, such areas where a small number of or no internal electrodes are present are subjected to a relatively large distortion, and the dielectrics in the areas have a relatively low adhesion. Therefore, structural defects such as delamination and microcracks may be caused due to a stress generated during firing of the multilayer body. The structural defects are a factor in the deterioration of the reliability of the multilayer ceramic capacitor.

A technique is known to address this problem. According to the technique, a level difference between a zone with an internal electrode and a zone without an internal electrode is reduced by a level difference-absorbing layer that is formed by printing a ceramic paste on the zone without an internal electrode. However, it is difficult to accurately form the level difference-absorbing layer in the zone where no internal electrode is present. For example, in a process for printing the ceramic paste, a gap may be provided between the internal electrode and the level difference-absorbing layer due to misalignment or expansion/contraction of a printing pattern.

In this regard, from the viewpoint of ease of manufacture, the inventor of preferred embodiments of the present invention has devised a process for simply making a portion of a level difference-absorbing layer overlap with a portion of an internal electrode (corresponding to forming a thick-walled portion) to make it unlikely that a gap will be provided between the internal electrode and the level difference-absorbing layer. However, the overlapping portion inevitably becomes thick. Therefore, the inventor of preferred embodiments of the present invention and the inventors of Japanese Unexamined Patent Application Publication No. 2006-278566 have devised a technique to reduce a level difference caused by overlap of an internal electrode and a level difference-absorbing layer, by forming an end portion of the internal electrode layer into an inclined surface and making the level-difference-absorbing layer overlap with this inclined surface.

SUMMARY OF THE INVENTION

Preferred embodiments of the present invention provide multilayer ceramic capacitors in each of which a level difference is reduced, without reducing ease of manufacture.

A multilayer ceramic capacitor according to a preferred embodiment of the present invention includes a multilayer body including a plurality of dielectric layers and a plurality of internal electrodes that are alternately stacked on one another, two main surfaces facing each other in a stacking direction, two end surfaces facing each other in a length direction orthogonal or substantially orthogonal to the stacking direction, and two side surfaces facing each other in a width direction orthogonal or substantially orthogonal to the stacking direction and the length direction, and two external electrodes respectively on the two end surfaces of the multilayer body. Each of the plurality of dielectric layers includes, at a location coincident with an end portion of a respective one of the internal electrodes, a thick-walled portion thicker in the stacking direction than a portion of the dielectric layer located at a middle portion of the main surface. When viewed in the stacking direction, positions of some of the thick-walled portions of the plurality of dielectric layers are out of alignment with positions of a remainder of the thick-walled portions of the plurality of dielectric layers.

Preferred embodiments of the present invention each make it possible to reduce a level difference in a multilayer ceramic capacitor, without reducing the ease of manufacture of the multilayer ceramic capacitor. In particular, preferred embodiments of the present invention each enable a reduction of a level difference between a zone with an internal electrode and a zone without an internal electrode and a reduction of a level difference caused by overlap of an internal electrode and a ceramic paste.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below with reference to the drawings.

Figure 1:
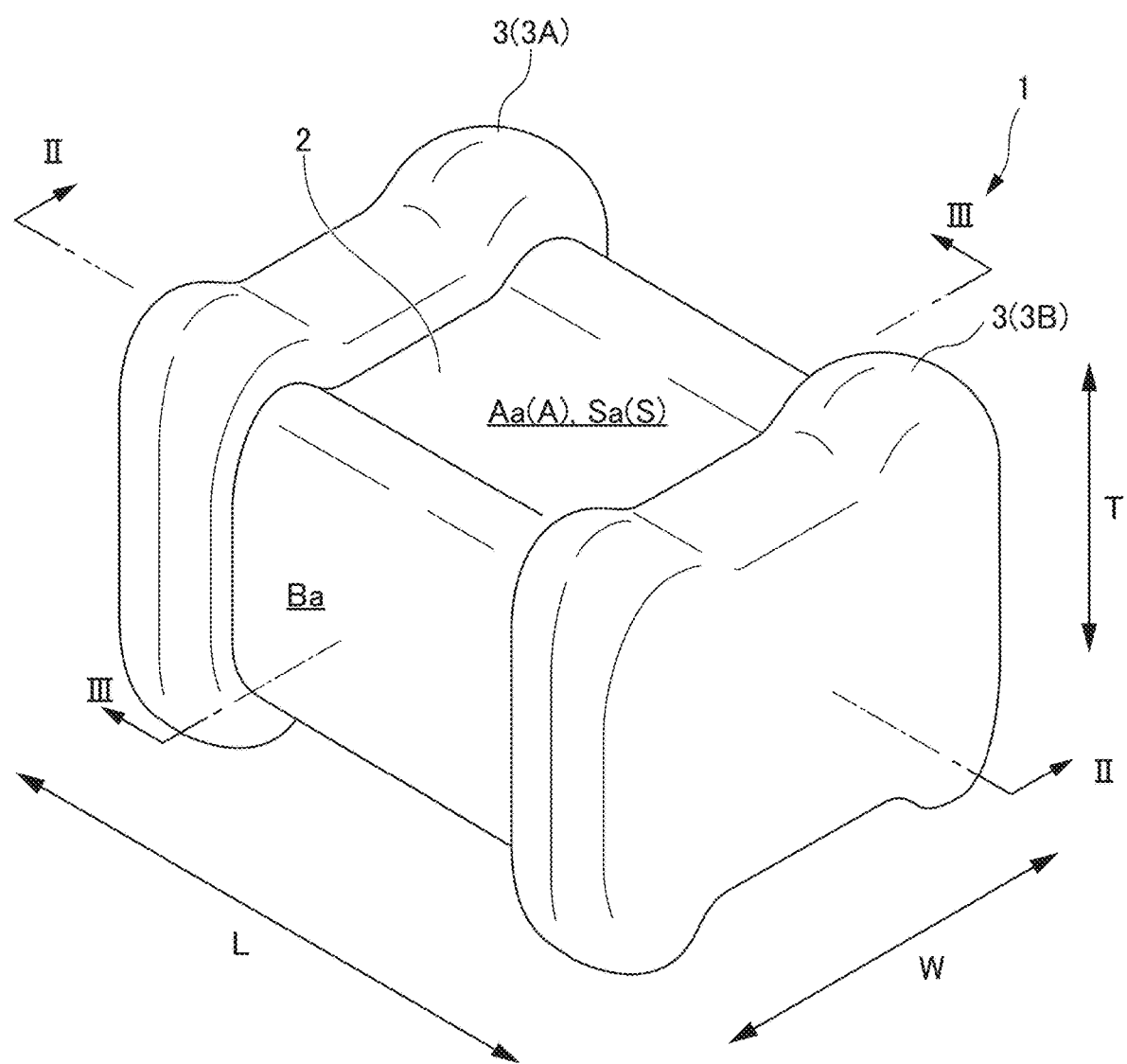
FIG. 1 is a schematic perspective view of a multilayer ceramic capacitor 1 according to a preferred embodiment of the present invention.
Figure 2:
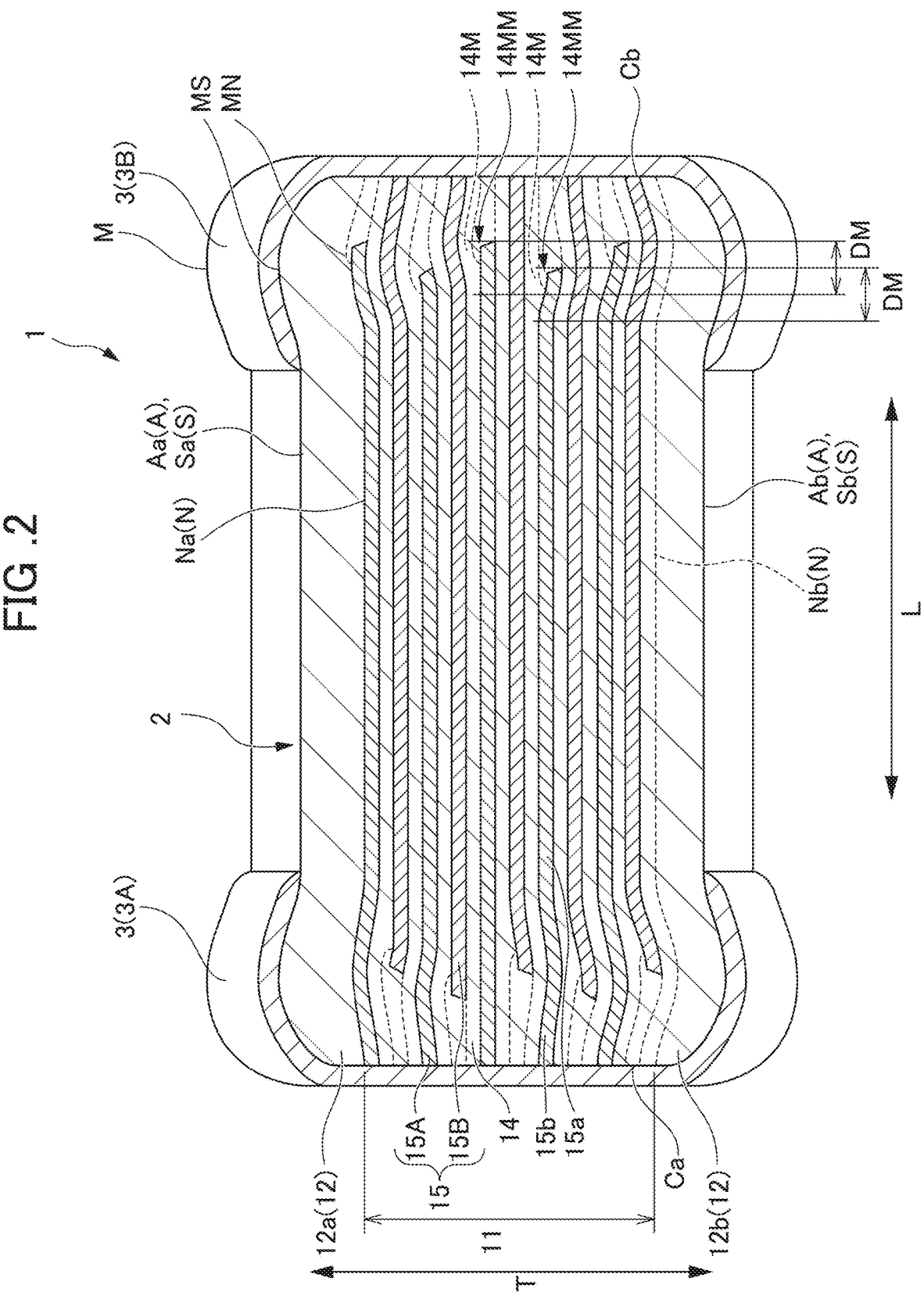
FIG. 2 is a cross-sectional view of the multilayer ceramic capacitor 1 of the preferred embodiment of the present invention, taken along the line II-II in FIG. 1.
Figure 3:
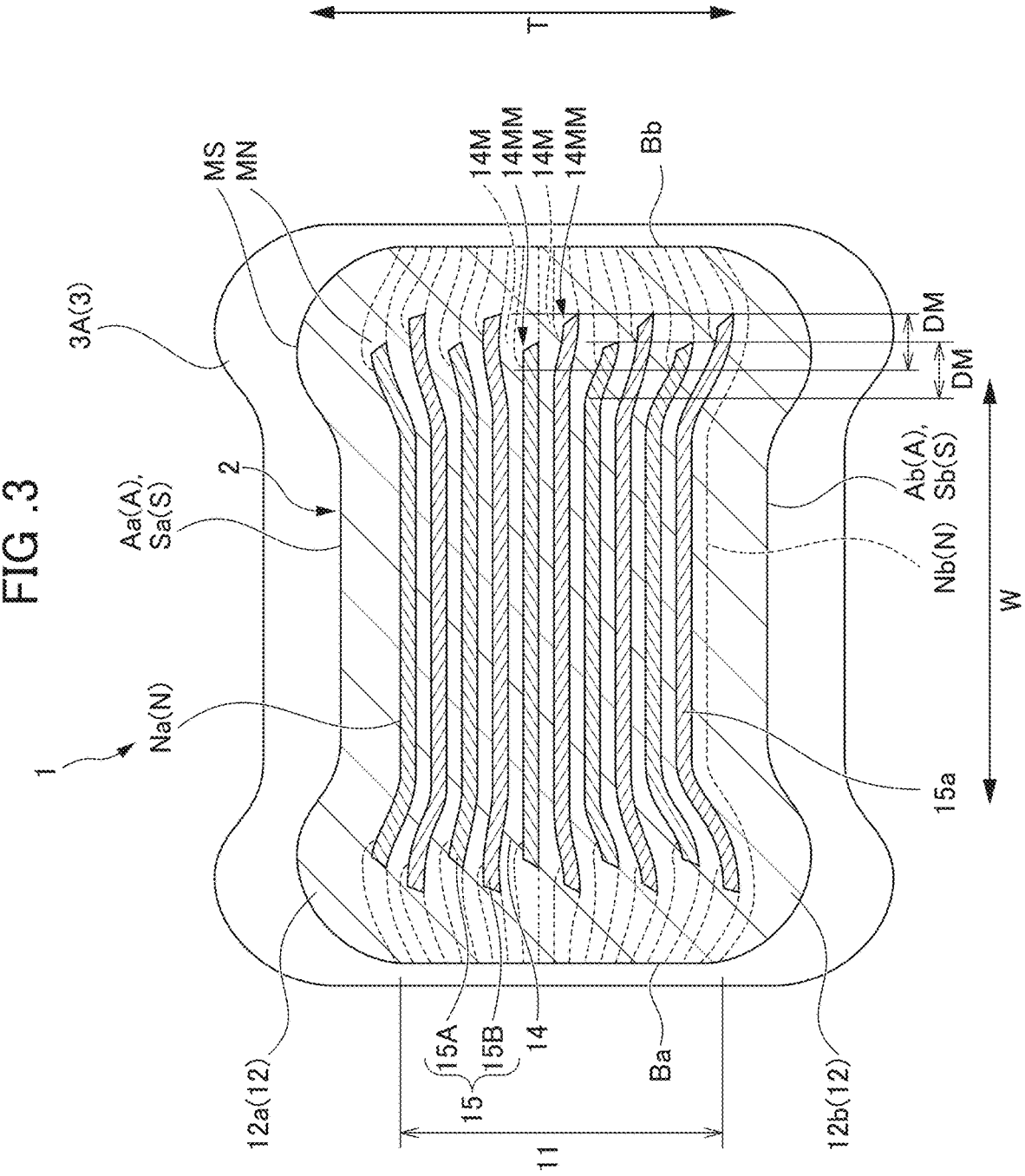
FIG. 3 is a cross-sectional view of the multilayer ceramic capacitor 1 of the preferred embodiment of the present invention, taken along the line III-III in FIG. 1.

A multilayer ceramic capacitor 1 according to a preferred embodiment of the present invention will be described below. FIG. 1 is a schematic perspective view of the multilayer ceramic capacitor 1 according to the present preferred embodiment. FIG. 2 is a cross-sectional view of the multilayer ceramic capacitor 1 of the present preferred embodiment, taken along the line II-II in FIG. 1. FIG. 3 is a cross-sectional view of the multilayer ceramic capacitor 1 of the present preferred embodiment, taken along the line III-III in FIG. 1.

Multilayer Ceramic Capacitor 1

The multilayer ceramic capacitor 1 includes a multilayer body 2 and a pair of external electrodes 3 provided at both ends of the multilayer body 2. The multilayer body 2 includes an inner layer portion 11 and outer layer portions 12. The inner layer portion 11 includes a plurality of sets of dielectric layers 14 (hereinafter referred to as the dielectric layer 14) and internal electrodes 15.

In the description below, the following terms are used to represent the orientations of the multilayer ceramic capacitor 1. A direction in which the dielectric layers 14 and the internal electrodes 15 are stacked (laminated) in the multilayer ceramic capacitor 1 is defined as a stacking direction T. With respect to the multilayer ceramic capacitor 1, a direction that is orthogonal or substantially orthogonal to the stacking direction T and in which the pair of external electrodes 3 are arranged is defined as a length direction L. A direction that is orthogonal or substantially orthogonal to both the length direction L and the stacking direction T is defined as width direction W. In the present preferred embodiment, the stacking direction T, the length direction L, and the width direction W are orthogonal or substantially orthogonal to one another. FIG. 2 is a LT cross-section (second cross-section) extending in the length direction L and the stacking direction T of the multilayer ceramic capacitor 1. FIG. 3 is a WT cross-section (first cross-section) extending in the width direction W and the stacking direction T of the multilayer ceramic capacitor 1.

Furthermore, in the following description, among the six outer surfaces of the multilayer body 2, a pair of outer surfaces that face each other in the stacking direction T are referred to as a first main surface Aa and a second main surface Ab, respectively, a pair of outer surfaces that face each other in the width direction W are referred to as a first side surface Ba and a second side surface Bb, respectively, and a pair of outer surfaces that face each other in the length direction L are referred to as a first end surface Ca and a second end surface Cb. When it is not necessary to particularly distinguish between the first main surface Aa and the second main surface Ab, they are collectively referred to as the main surface(s) A. When it is not necessary to particularly distinguish between the first side surface Ba and the second side surface Bb, they are collectively referred to as the side surface(s) B. When it is not necessary to particularly distinguish between the first end surface Ca and the second end surface Cb, they are collectively referred to as the end surface(s) C. Furthermore, with respect to the multilayer ceramic capacitor 1 as a whole, a surface adjacent to the first main surface Aa is defined as a first main surface Sa, and a surface adjacent to the second main surface Ab is defined as a second main surface Sb. When it is not necessary to particularly distinguish between them, they are collectively referred to as the main surface(s) S. With respect to the inner layer portion 11, a surface adjacent to the first main surface Aa is defined as an inner layer portion first main surface Na, and a surface adjacent to the second main surface Ab is defined as an inner layer portion second main surface Nb. When it is not necessary to particularly distinguish between them, they are collectively referred to as the inner layer portion main surface(s) N.

Multilayer Body 2

The multilayer body 2 includes the inner layer portion 11 and the outer layer portions 12 on both sides in the stacking direction T of the inner layer portion 11. The dimensions of the multilayer body 2 are not limited. However, it is preferable that, for example, the dimension in the length direction L is about 0.2 mm or more and about 10 mm or less, the dimension in the width direction W is about 0.1 mm or more and about 10 mm or less, and the dimension in the stacking direction T is about 0.1 mm or more and about 5 mm or less.

Inner Layer Portion 11

The inner layer portion 11 includes the plurality of sets of the dielectric layer 14 and the internal electrode 15 alternately stacked in the stacking direction T.

Internal Electrodes 15

The internal electrodes 15 include a plurality of first internal electrodes 15A and a plurality of second internal electrodes 15B. The first internal electrodes 15A and the second internal electrodes 15B are alternately arranged. When it is not necessary to distinguish between the first internal electrode 15A and the second internal electrode 15B, they are collectively referred to as the internal electrode(s) 15.

The internal electrodes 15 are preferably made of a metallic material, examples of which include Ni, Cu, Ag, Pd, a Ag—Pd alloy, Au, etc. The number of the internal electrodes 15 inclusive of the first internal electrodes 15A and the second internal electrodes 15B is preferably 15 or more and 2000 or less, for example.

The internal electrodes 15 each include an opposing portion 15a and a lead-out portion 15b that extends from the opposing portion 15a to the end surface C and is connected to the external electrode 3. Due to this configuration, the first internal electrodes 15A extend to the first external electrode 3A and are spaced apart from the second external electrode 3B. The second internal electrodes 15B extend to the second external electrode 3B and are spaced apart from the first external electrode 3A.

Dielectric Layers 14

The dielectric layers 14 include a ceramic material. The ceramic material is, for example, a dielectric ceramic including $BaTiO_3$ as a main component. Alternatively, the ceramic material may include, in addition to the main component, at least one of sub-components such as a Mn compound, a Fe compound, a Cr compound, a Co compound, and a Ni compound, or a rare earth, for example. The number of the dielectric layers 14 inclusive of an upper outer layer portion 12a and a lower outer layer portion 12b is preferably 15 or more and 2000 or less, for example.

An interface layer including tin (Sn) may be located at the interface between each dielectric layer 14 and a respective internal electrode 15, and may define a portion of the dielectric layer 14. For example, the interface layer can be made from an oxide of Sn added to a green sheet as a precursor of the dielectric layer and can be formed through firing of the multilayer body. The interface layer increases the high temperature load life of the multilayer ceramic capacitor, thus improving the reliability of the multilayer ceramic capacitor.

Figure 4:
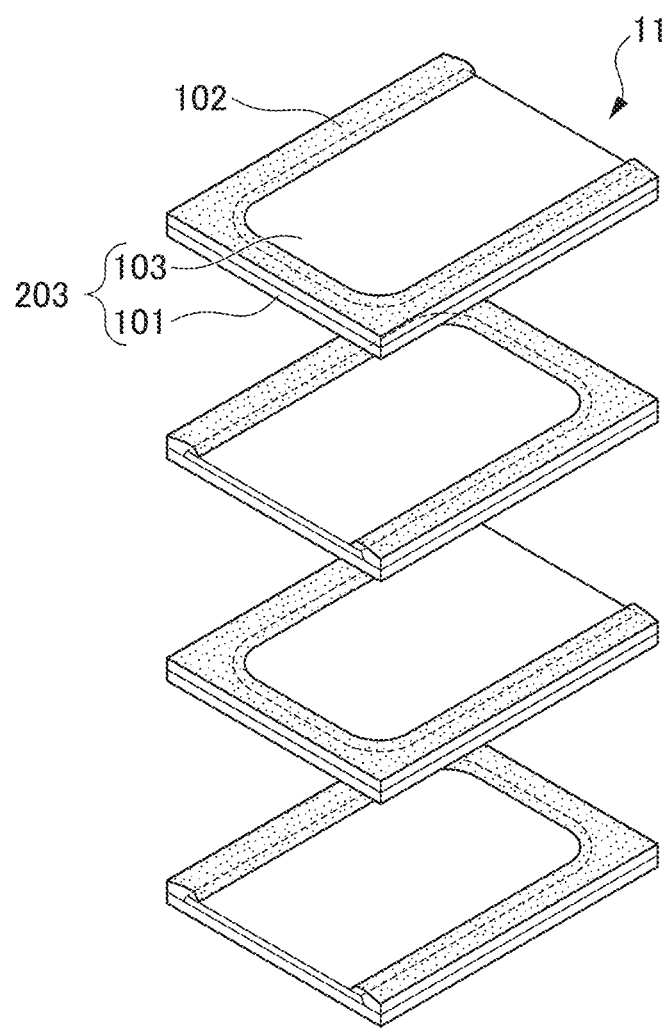
FIG. 4 is an exploded perspective view for explaining a lamination state of an inner layer portion 11.

FIG. 4 is an exploded perspective view for explaining a lamination state of the inner layer portion 11. As will be described in detail later, to manufacture the multilayer ceramic capacitor 1, material sheets 203 are prepared. Each material sheet 203 includes a ceramic green sheet 101 to be converted into the dielectric layer 14, and an internal electrode pattern 103 printed on the ceramic green sheet 101 and to be converted into the internal electrode 15. Each material sheet 203 further includes thereon a ceramic paste 102 printed in a portion where the internal electrode pattern 103 is absent. The ceramic paste 102 covers a peripheral edge portion of the internal electrode 15. The material sheets 203, each of which includes the ceramic paste 102 printed thereon to cover the peripheral edge portion of the internal electrode 15, are stacked on each other to form the inner layer portion 11.

Since the ceramic paste 102 overlaps with the internal electrode 15 while covering the peripheral edge portion of the internal electrode 15, each dielectric layer 14 includes, at a location coincident with an end portion of the internal electrode 15, a thick-walled portion 14M that is thicker in the stacking direction T than another portion of the dielectric layer 14 corresponding to a middle portion of the inner layer portion main surface N, i.e., a middle portion of the main surface A of the multilayer body, as illustrated in FIGS. 2 and 3. The thick-walled portion 14M will be described in detail later. As a result, the main surface N of the inner layer portion includes inner layer raised portions MN respectively provided on one side and the other side with the middle portion interposed therebetween. The inner layer raised portions MN are each raised to be thicker in the stacking direction T from the middle portion toward the outer periphery of the main surface N of the inner layer portion.

Specifically, on the main surface N of the inner layer portion, the inner layer raised portions MN are respectively provided at locations corresponding to both end portions of the internal electrodes 15 in the width direction W, and extend along the main surface N in the length direction L. Furthermore, on the main surface N, the inner layer raised portions MN are respectively provided at locations corresponding to both end portions of the opposing portions 15a in the length direction L, and extend along the main surface N in the width direction W.

Outer Layer Portions 12

The outer layer portions 12 include the upper outer layer portion 12a and the lower outer layer portion 12b that are provided on one side and the other side of the inner layer portion 11 in the stacking direction T, respectively. When it is not necessary to particularly distinguish between the upper outer layer portion 12a and the lower outer layer portion 12b, they are collectively referred to as the outer layer portion(s) 12. The outer layer portions 12 are made of the same material as that of the dielectric layers 14 of the inner layer portion 11. For example, the outer layer portions 12 preferably have a thickness of about 200 μm or less, and more preferably about 20 μm or less.

The upper outer layer portion 12a and the lower outer layer portion 12b respectively provided on both sides in the stacking direction of the inner layer portion 11 have a constant or substantially constant thickness. In the present preferred embodiment, the upper outer layer portion 12a and the lower outer layer portion 12b have the same or substantially the same thickness. However, this is a non-limiting example, and the upper outer layer portion 12a and the lower outer layer portion 12b may have different thicknesses. Due to the inner layer raised portions MN, the multilayer body 2 including the upper outer layer portion 12a and the lower outer layer portion 12b include multilayer body raised portions MS on the main surfaces A of the multilayer body. The multilayer body raised portions MS are provided at one side and the other side of the main surface A with the middle portion interposed therebetween, and are each raised to become thicker in the stacking direction T from the middle portion toward the outer periphery of the main surface A.

Specifically, on the main surface A of the multilayer body, the multilayer body raised portions MS are respectively provided at locations corresponding to areas where both end portions of the internal electrodes 15 in the width direction W are located inside in the stacking direction T, and extend along the main surface A in the length direction L. Furthermore, on the main surface A of the multilayer body, the multilayer body raised portions MS are respectively formed at sites corresponding to areas where both end portions of the opposing portions 15a in the length direction L are located inside in the stacking direction T, and extend along the main surface A in the width direction W.

External Electrodes 3

The end portion of the lead-out portion 15b of each first internal electrode 15A is exposed to the first end surface Ca, and is electrically connected to the first external electrode 3A. The end portion of the lead-out portion 15b of each second internal electrode 15B is exposed to the second end surface Cb, and is electrically connected to the second external electrode 3B. As a result, a structure in which a plurality of capacitor elements are electrically connected in parallel is provided between the first external electrode 3A and the second external electrode 3B. Furthermore, the external electrodes 3 cover not only the end surfaces C, but also portions of the main surfaces A of the multilayer body and portions of the side surfaces B adjacent to the end surfaces C. The external electrodes 3 further cover the multilayer body raised portions MS.

Due to the inner layer raised portions MN and the multilayer body raised portions MS, the multilayer ceramic capacitor 1 including the external electrodes 3 also includes raised portions M on the two main surfaces S facing each other in the stacking direction T. The raised portions M are provided at one side and the other side of each main surface S with the middle portion interposed therebetween, and are each raised to become thicker in the stacking direction T from the middle portion toward the outer periphery of the main surface S.

Specifically, on each main surface S, the raised portions M are respectively provided at locations corresponding to areas where both end portions of the internal electrodes 15 in the width direction W are located inside in the stacking direction T, and extend along the main surface S in the length direction L. Furthermore, on each main surface S, the raised portions M are respectively provided at locations corresponding to areas where both end portions of the opposing portions 15a in the length direction L are located inside in the stacking direction T, and extend along the main surface S in the width direction W.

Here, for example, in a case in which a multilayer ceramic capacitor is thinner in its outer peripheral portion than its middle portion, when the multilayer ceramic capacitor is placed on a substrate, the multilayer ceramic capacitor is likely to rock from side to side and its posture becomes unstable. In contrast, the multilayer ceramic capacitor 1 can be in a stable posture on a substrate, without rocking in any directions.

The end portions of the lead-out portions 15b of the internal electrodes 15 exposed to the end surfaces C are covered with the external electrodes 3. Here, there is a possibility that moisture and water vapor penetrate through the boundary between the external electrode 3 and the multilayer body 2. However, according to the present preferred embodiment, the external electrodes 3 not only cover the end surfaces C, but also extend to the main surfaces A of the multilayer body to cover the multilayer body raised portions MS. Therefore, even when moisture enters through a gap at the boundary between the multilayer body 2 and the external electrode 3 from the main surface S, the moisture is impeded by the multilayer body raised portion MS provided inside the gap. Accordingly, it is difficult for moisture to reach the internal electrodes 15 by passing over the multilayer body raised portion MS and going around the end surface C. Thus, the intrusion of moisture through the boundary between the internal electrode 15 and the dielectric layer 14 is reduced or prevented.

Thick-Walled Portions

As described above, the thick-walled portion 14M of the dielectric layer 14 is provided by the ceramic paste 102 overlapping with an end portion of the internal electrode 15 (see FIGS. 4 and 7 to 9). Thus, as illustrated in FIGS. 2 and 3, each thick-walled portion 14M defines a portion of the electric layer 14 including the ceramic paste 102, and is provided at a location of the dielectric layer 14 that coincides with the end portion of the internal electrode 15. For example, as illustrated in FIG. 3, the thick-walled portions 14M are at locations coincident with both end portions in the width direction W (widthwise end portions) of the internal electrodes 15. As illustrated in FIG. 2, the thick-walled portions 14M are at locations coincident with both end portions in the length direction L (lengthwise end portions) of the internal electrodes 15.

As illustrated in FIG. 3, for example, each thick-walled portion 14M has a band shape having a width DM of about 10 μm or more and about 90 μm or less, preferably about 20 μm or more and about 80 μm or less, and more preferably about 30 μm or more and about 70 μm or less, in the width direction W from the end of the associated internal electrode 15, and extends in the length direction L. As illustrated in FIG. 2, for example, each thick-walled portion 14M has a band shape having a width DM of about 10 μm or more and about 90 μm or less, preferably about 20 μm or more and about 80 μm or less, and more preferably about 30 μm or more and about 70 μm or less, in the length direction L from the end of the associated internal electrode 15, and extends in the width direction W. Each thick-walled portion 14M has a thickest portion 14MM at a position coincident with the end of the associated internal electrode 15.

The thickness of the thickest portion 14MM of the thick-walled portion 14M is, for example, about 1.05 times or more and about 1.30 times or less as thick as a portion of the dielectric layer 14 that corresponds in position to the middle portion of the main surface N of the inner layer portion, i.e., the middle portion of the main surface A of the multilayer body. These thicknesses can be observed with a microscope or a SEM. Alternatively, the thickness of the middle portion of the dielectric layer 14 may be determined as follows. A region excluding, from both ends of the internal electrode, portions of about 100 μm or portions corresponding to about 10% of the widthwise dimension of the internal electrode is divided into five equal segments, and the average of the thicknesses of the five equal segments may be defined as the thickness of the middle portion of the dielectric layer 14.

As illustrated in FIGS. 2 and 3, when viewed in the stacking direction T, the positions of some of the thick-walled portions 14M are out of alignment with positions of the rest of the thick-walled portions 14M. For example, as illustrated in FIG. 3, the positions of the thick-walled portions 14M overlapping with the widthwise end portions of the internal electrodes 15 are out of alignment with each other in the width direction W. As illustrated in FIG. 2, the positions of the thick-walled portions 14M overlapping with the lengthwise end portions of the internal electrodes 15 are out of alignment with each other in the length direction L.

For example, the positions of the thick-walled portions 14M adjacent to each other in the stacking direction T may be out of alignment with each other. Alternatively, the positions of the majority of thick-walled portions 14M adjacent to each other in the stacking direction T may be in alignment with each other while the positions of the rest of the thick-walled portions 14M may be out of alignment. In the example illustrated in FIGS. 2 and 3, the thick-walled portions 14M are out of alignment in a regular manner and are at two positions. However, the present invention is not limited to this example. For example, the thick-walled portions 14M may be out of alignment to be at three or more positions or may be randomly out of alignment.

Making the positions of the thick-walled portions 14M out of alignment with each other may mean arranging the thickest portions 14MM out of alignment with each other, or arranging the overall widths DM out of alignment with each other.

As described above, the thickest portion 14MM of each thick-walled portion 14M is at the position coincident with the end of the associated internal electrode 15. Specifically, as illustrated in FIGS. 2 and 3, when viewed in the stacking direction T, the positions of the end portions of some of the internal electrodes 15 are out of alignment with the positions of the end portions of the other internal electrodes 15. For example, as illustrated in FIG. 3, the positions of the widthwise end portions of the first internal electrodes 15A are out of alignment in the width direction W with the positions of the widthwise end portions of the second internal electrodes 15B. As shown in FIG. 2, the positions of the lengthwise end portions of the first internal electrode 15A are out of aliment in the width direction W, and the positions of the lengthwise end portions of the second internal electrodes 15B are out of aliment in the width direction W.

Method of Manufacturing Multilayer Ceramic Capacitor 1

Figure 5:
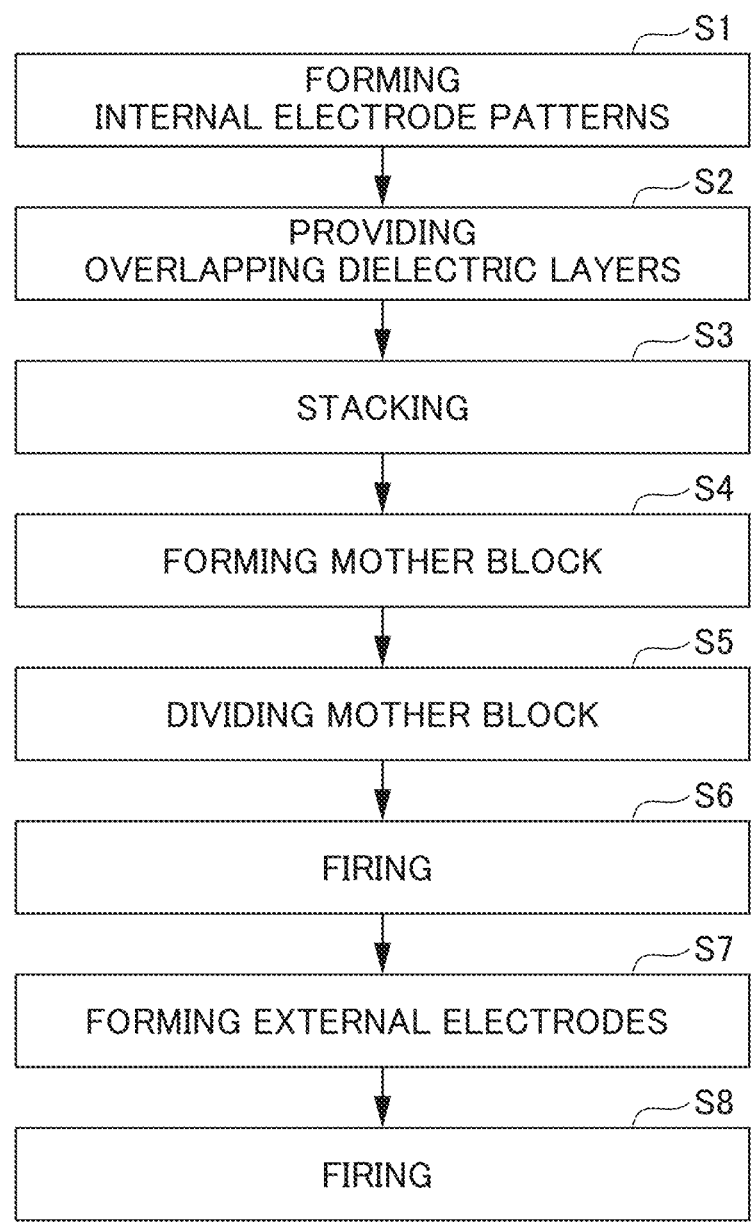
FIG. 5 is a flowchart illustrating a non-limiting example of a method of manufacturing the multilayer ceramic capacitor 1.

Next, a non-limiting example of a method of manufacturing the multilayer ceramic capacitor 1 of the present preferred embodiment will be described. FIG. 5 is a flowchart illustrating the example of the method of manufacturing the multilayer ceramic capacitor 1.

Internal Electrode Pattern Forming Step S1

Figure 6:
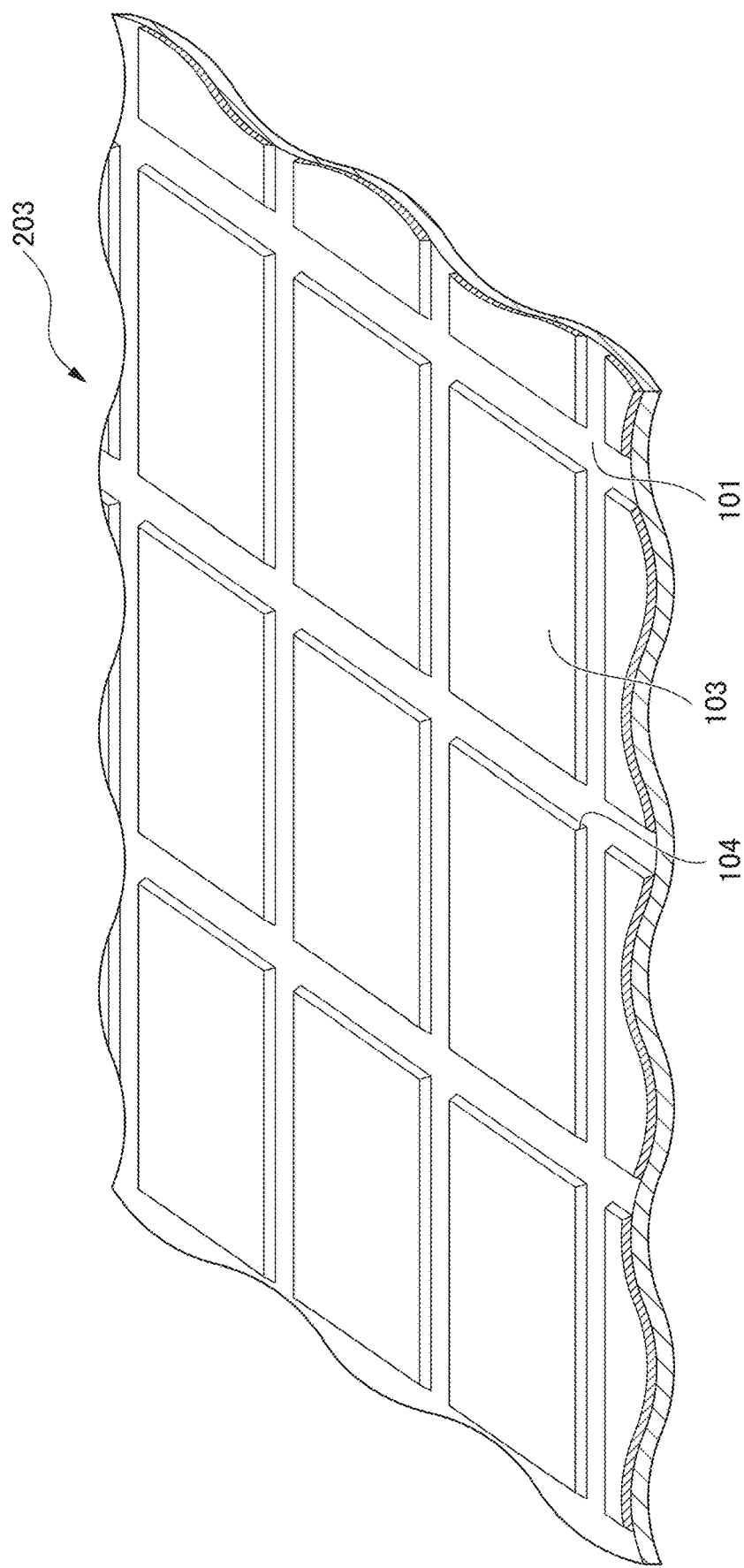
FIG. 6 is a perspective view of a material sheet 203 including a ceramic green sheet 101 including a surface on which internal electrode patterns 103 to be converted into internal electrodes 15 are printed.

First, a conductive paste is applied to the ceramic green sheet 101 to be converted into the dielectric layer 14, thus forming internal electrode patterns 103 to be converted into the internal electrodes 15. FIG. 6 is a perspective view of the material sheet 203 including the ceramic green sheet 101 including a surface on which the internal electrode patterns 103 to be converted into the internal electrodes 15 are printed.

Ceramic Green Sheet 101

The ceramic green sheet 101 is a band-shaped sheet including a carrier film and a ceramic slurry applied in a sheet shape on the carrier film. The ceramic slurry includes a ceramic powder, a binder, and a solvent and is applied using, for example, a die coater, gravure coater, a microgravure coater, or the like.

Internal Electrode Patterns 103

The internal electrode patterns 103 are formed by, for example, screen printing, gravure printing, relief printing, or the like. Among these, screen printing is preferred. Screen printing is performed using a screen printing plate having a printing pattern formed thereon, while a tension is applied to the periphery of the screen printing plate. The tension to be applied to the screen printing plate is adjusted for respective locations of the periphery, thus making it possible to reduce displacement and shape distortion, etc. of the internal electrode patterns that can be caused by misalignment or stretch/contraction, etc. of the printing pattern.

Here, the internal electrode pattern 103 has a thickness that produces a level difference 104 on the ceramic green sheet 101. In the present preferred embodiment, the internal electrode pattern 103 includes sloped surfaces that define the level difference 104.

Overlapping Dielectric Layer Forming Step S2

Figure 7:
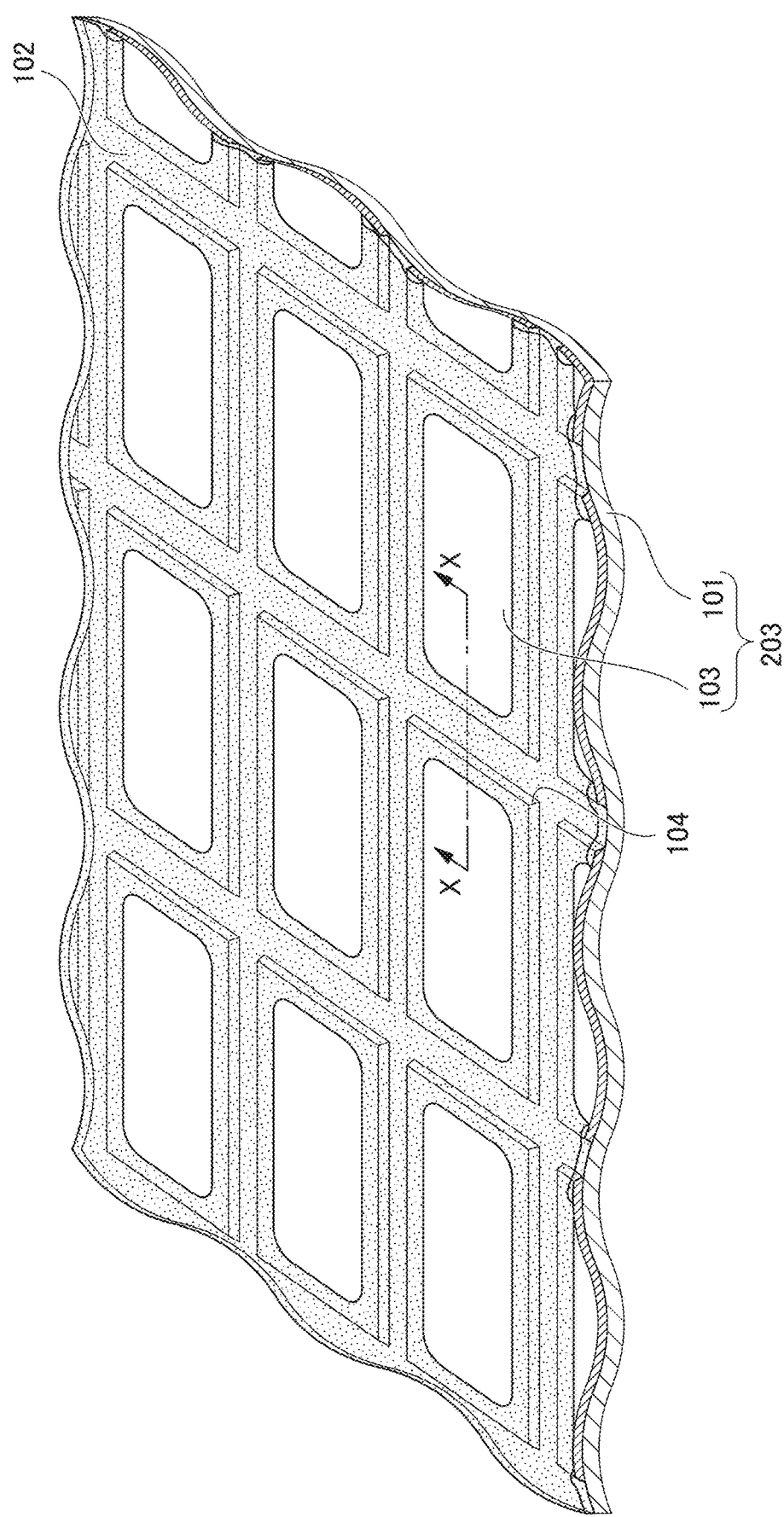
FIG. 7 is a perspective view of the material sheet 203 with a ceramic paste 102 applied thereto.
Figure 8:
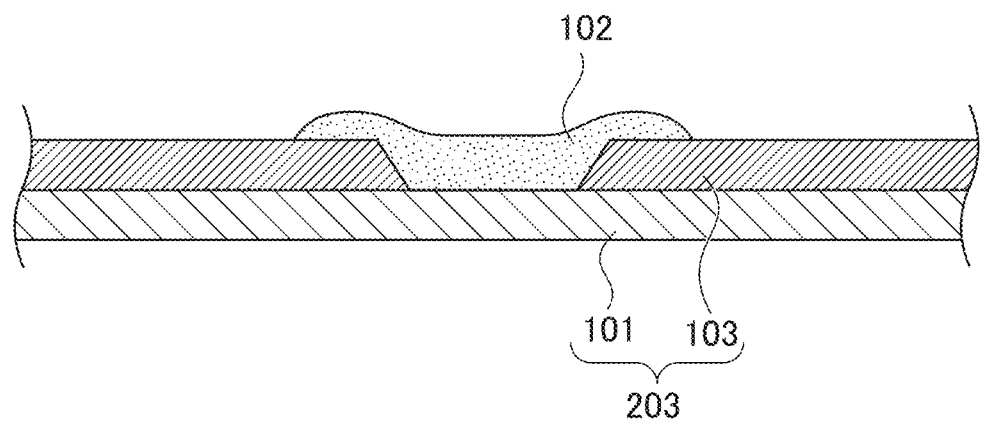
FIG. 8 is a partial cross-sectional view of FIG. 7.

Next, the ceramic paste 102 is provided on the material sheet 203. The ceramic paste 102 fills the level difference 104 produced by the thickness of the internal electrode patterns 103, and forms the dielectric layers overlapping with the outer peripheral portions of the internal electrode patterns 103. FIG. 7 is a perspective view illustrating a state in which the material sheet 203 has the ceramic paste 102 provided thereon. FIG. 8 is a cross-sectional view taken along the line X-X in FIG. 7.

The ceramic paste 102 is applied by, for example, screen printing, gravure printing, relief printing, or the like. Among them, screen printing is preferred. Screen printing is performed using a screen printing plate having a printing pattern formed thereon, while a tension is applied to the periphery of the screen printing plate. The tension to be applied to the screen printing plate is adjusted for respective locations of the periphery, thus making it possible to reduce displacement and shape distortion, etc. of the ceramic paste that can be caused by misalignment or stretch/contraction, etc. of the printing pattern.

The ceramic paste 102 may be the same as or different from the dielectric as the material for the ceramic green sheet 101 in terms of the component ratio, or may include different components from those of the dielectric. For example, the grains (ceramic particles) of the ceramic paste 102 may be the same as or different from the grains (ceramic particles) of the ceramic green sheet 101. The amount of the grains in the ceramic paste 102 may be the same as or different from the amount of the grains in the ceramic green sheet 101.

The ceramic paste 102 is applied so as to overlap with the peripheral edge portion of the internal electrode 15 by a predetermined width. The width of the overlap is, for example, about 100 μm or less, and preferably about 10 μm or more and about 90 μm or less. As a result, as described above, the thick-walled portions 14M, which have a band shape having a width DM of, for example, about 10 μm or more and about 90 μm or less from the ends of the internal electrodes 15 are formed through the firing. As illustrated in FIG. 8, since the internal electrode patterns 103 produce the level difference 104 as the sloped surfaces, the ceramic paste 102 gradually spreads onto the internal electrode patterns 103. As a result, the upper surface of the ceramic paste 102 becomes smooth.

Figure 10:
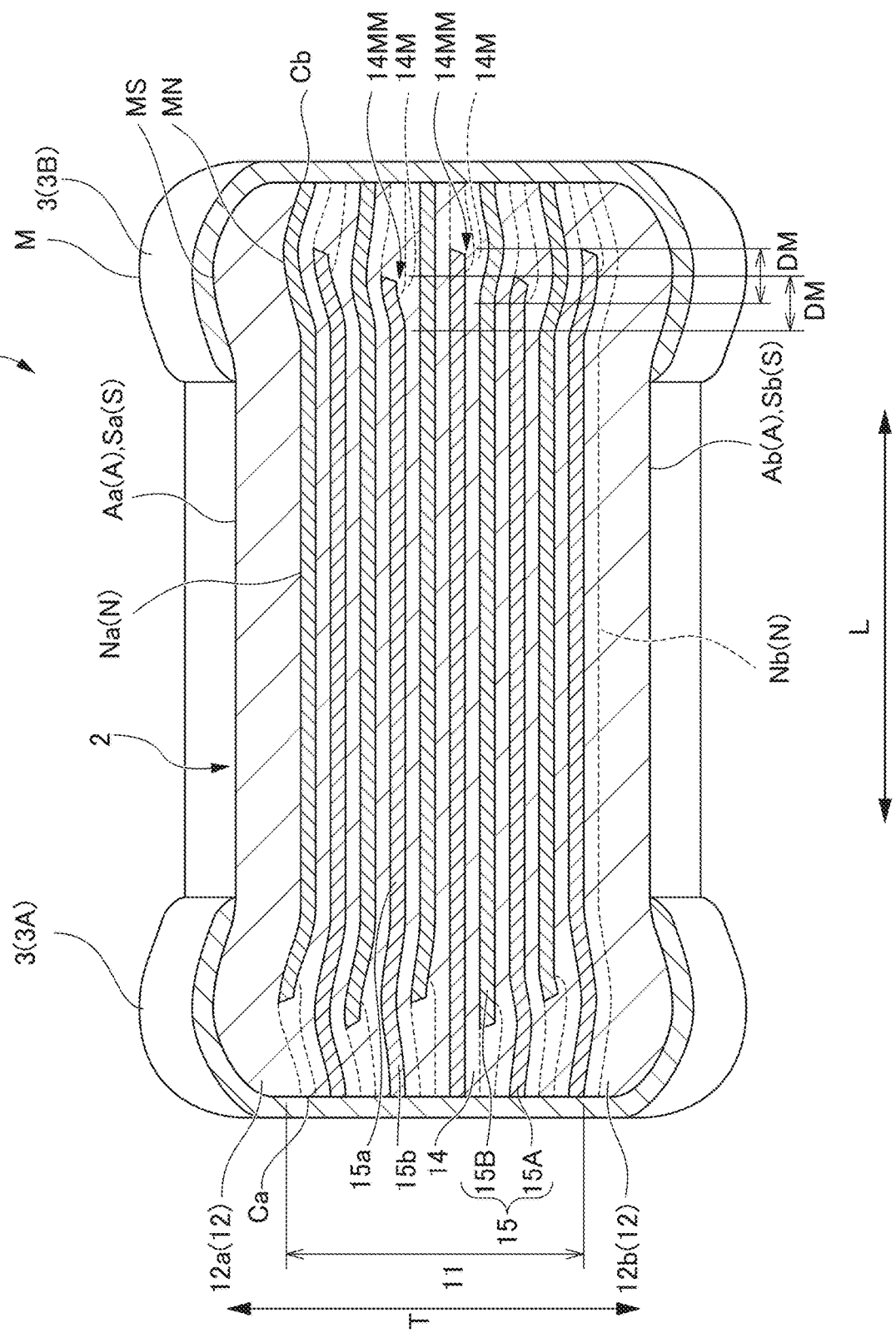
FIG. 10 is a cross-sectional view of a multilayer ceramic capacitor 1 according to a modification of the preferred embodiment of the present invention, taken along a line corresponding to the line II-II in FIG. 1.
Figure 11:
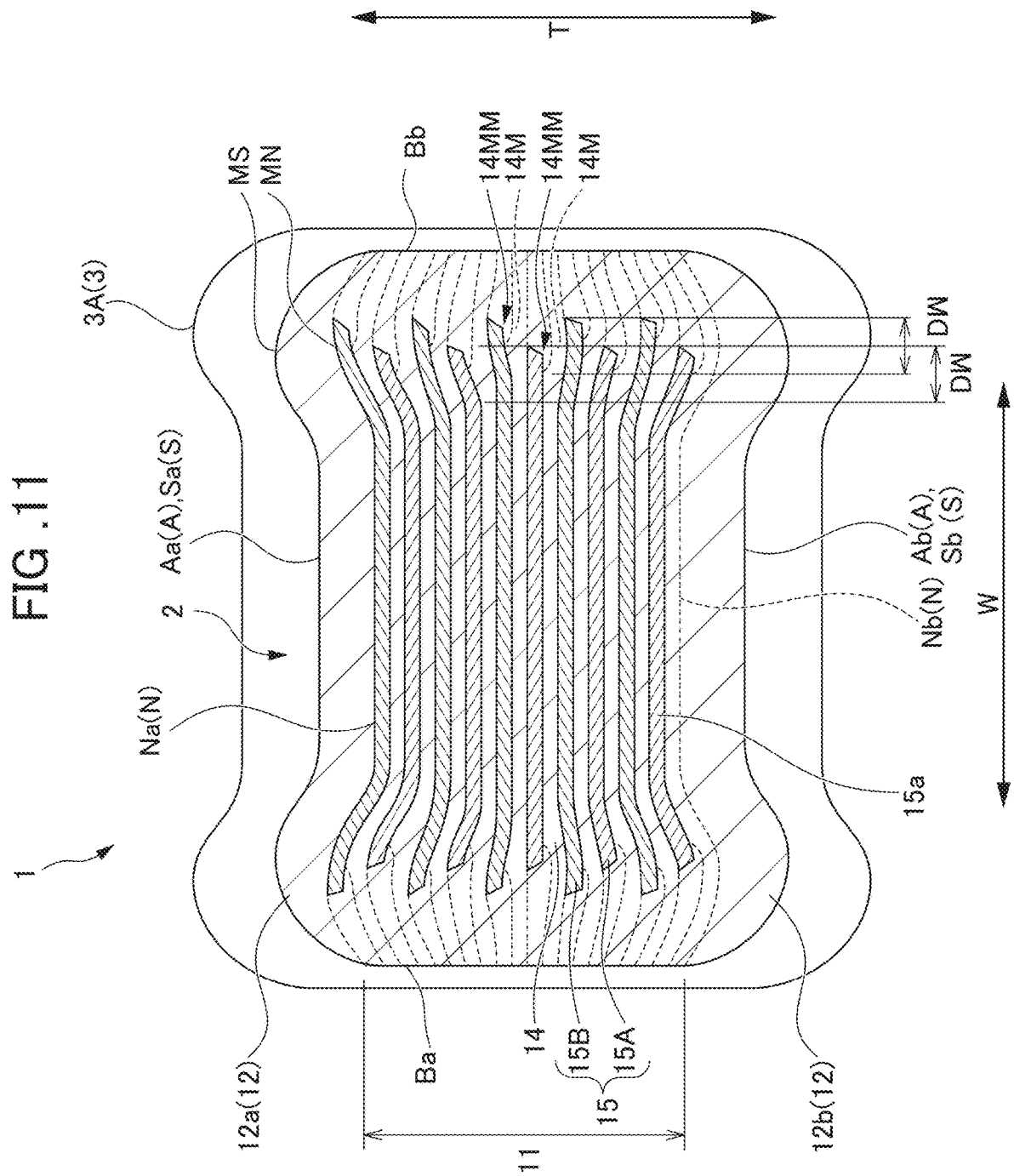
FIG. 11 is a cross-sectional view of a multilayer ceramic capacitor 1 according to the modification of the preferred embodiment of the present invention, taken along a line corresponding to the line III-III in FIG. 1.

In the present preferred embodiment, the internal electrode patterns 103 are provided on the ceramic green sheet 101 first, and thereafter, the ceramic paste 102 is applied to overlap with the internal electrode patterns 103, so that the multilayer ceramic capacitor 1 is produced to have the cross-sectional structure illustrated in FIGS. 2 and 3. However, the present preferred embodiment is not limited to this. The ceramic paste 102 for forming the dielectric layers may be applied to the ceramic green sheet 101 in outer peripheral portions of locations in which the internal electrode patterns 103 are to be formed, and thereafter, the internal electrode patterns 103 may be provided to overlap with the ceramic paste 102. In this way, a multilayer ceramic capacitor 1 having the cross-sectional structure illustrated in FIGS. 10 and 11 is produced.

Stacking Step S3

Figure 9:
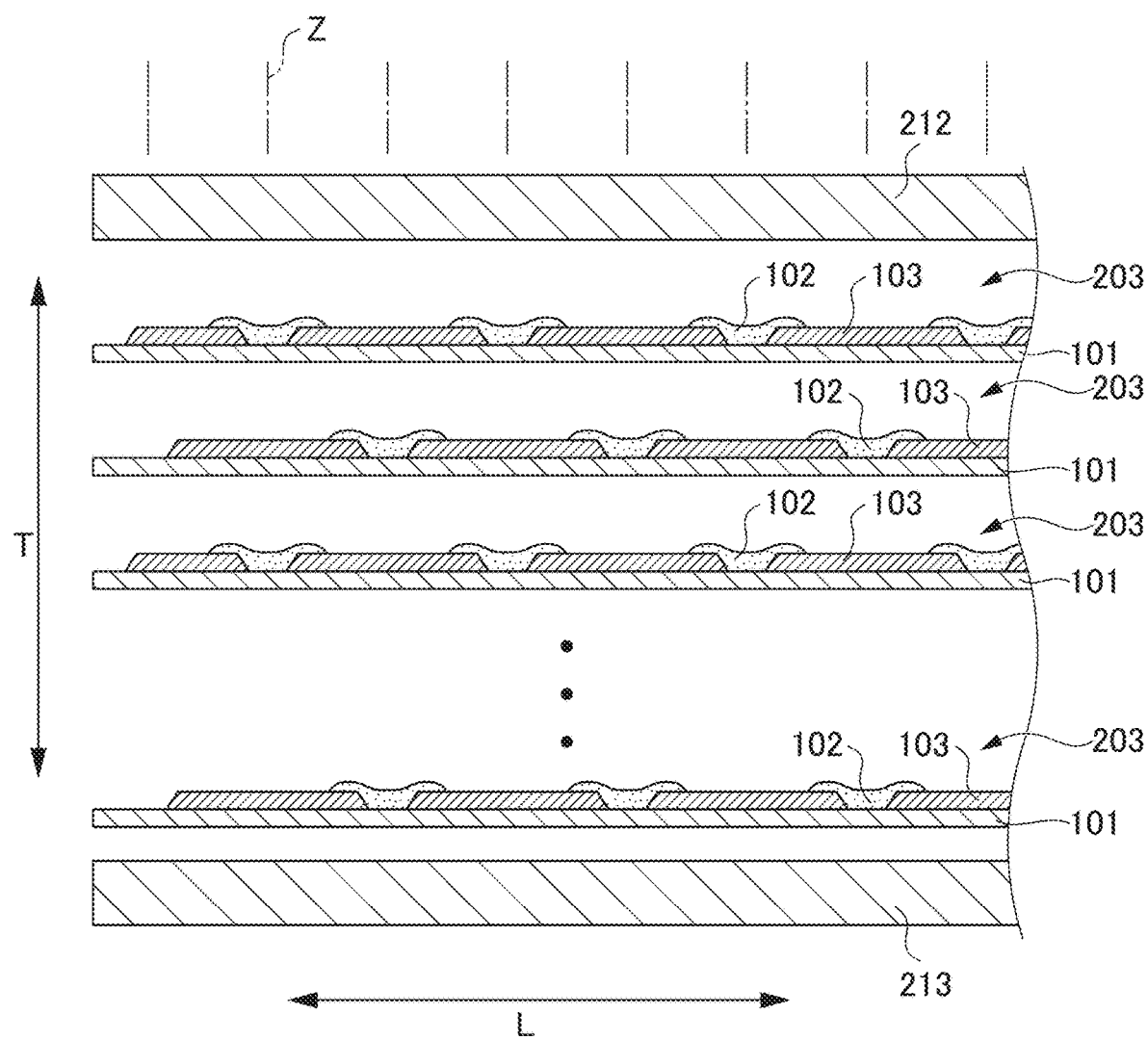
FIG. 9 is a diagram illustrating a state in which the material sheets 203 are stacked.

FIG. 9 is a diagram illustrating a state in which the material sheets 203 are stacked. As illustrated in FIG. 9, the material sheets 203 are arranged such that the internal electrode patterns 103 adjacent to each other in the stacking direction T are alternately out of alignment in the length direction L. In this step, the material sheets 203 are placed such that in the stacking direction T, the end portions of some of the internal electrode patterns 103 are out of alignment with the end portions of the other internal electrode patterns 103, i.e., the positions of some of the thick-walled portions 14M are out of alignment with the positions of the other thick-walled portions 14M.

Furthermore, an upper outer layer portion-ceramic green sheet 212 to be converted into the upper outer layer portion 12a is stacked on one side of the stack of the plurality of material sheets 203, and a lower outer layer portion-ceramic green sheet 213 to be converted into the lower outer layer portion 12b is stacked on the other side of the stack of the plurality of material sheets 203.

Mother Block Forming Step S4

Subsequently, the upper outer layer portion-ceramic green sheet 212, the stack of the plurality of material sheets 203, and the lower outer layer portion-ceramic green sheet 213 are subjected to thermocompression bonding so as to be formed into a mother block (a multilayer body-pressing step).

Mother Block Dividing Step S5

Next, the mother block is cut at the positions Z illustrated in FIG. 9 into multilayer chips. Although only the cutting positions Z arranged in the length direction L are illustrated, the multilayer chips are produced by cutting the mother block also along lines in the length direction L that are orthogonal or substantially orthogonal to the positions Z extending in the width direction.

Firing Step S6

The multilayer chips are heated at a set firing temperature for a predetermined time in a nitrogen atmosphere, for example. As a result, a plurality of rectangular or substantially rectangular multilayer bodies 2 are produced.

External Electrode Forming Step S7

Next, the external electrodes 3 are formed at both ends of each multilayer body 2.

Firing Step S8

The multilayer bodies 2 are heated at a set firing temperature for a predetermined time in a nitrogen atmosphere, for example. As a result, the external electrodes 3 are baked onto each multilayer body 2, such that the multilayer ceramic capacitors 1 illustrated in FIG. 1 are manufactured.

As described above, the multilayer ceramic capacitor 1 according to present preferred embodiment has a configuration in which each dielectric layer 14 includes, at a location coincident with the end portion of the associated internal electrode 15, the thick-walled portion 14M that is thicker in the stacking direction T than another portion of the dielectric layer 14 corresponding in position to the middle portion of the main surface N of the inner layer portion, i.e., the middle portion of the main surface A of the multilayer body. In other words, the ceramic paste 102 overlaps with the end portions of the internal electrodes 15. Thus, the feature, in which the ceramic paste 102 is simply applied to overlap with the end portions of the internal electrodes 15, makes it unlikely for the internal electrodes 15 and the ceramic paste 102 to have a gap therebetween, without reducing ease of manufacture.

The multilayer ceramic capacitor 1 of the present preferred embodiment has a configuration in which, as viewed in the stacking direction T, the positions of some of the plurality of thick-walled portions 14M of the plurality of dielectric layers 14 are out of alignment with the positions of the others of the plurality of thick-walled portions 14M. This feature makes it possible to reduce the level difference between a zone with the internal electrode 15 and a zone without the internal electrode 15, and consequently, to reduce the thicknesses of the raised portions (the inner layer raised portions MN, the multilayer body raised portions MS, and the raised portions M) due to the overlap of the internal electrodes 15 and the ceramic paste 102. Thus, the level differences in the multilayer ceramic capacitor 1 can be reduced.

Here, an increase in the thicknesses of the raised portions due to the overlap of the internal electrodes 15 and the ceramic paste 102, i.e., an increase in the level difference is considered to produce the same problem as that caused by the above-described level difference between a zone with the internal electrode and a zone without the internal electrode. That is, in portions other than the raised portions, a relatively large distortion occurs during the step of pressing the multilayer body, and the dielectric layers have a relatively low adhesion. For these reasons, structural defects such as delamination and microcracks may be caused due to a stress generated during the firing of the multilayer body. Such structural defects are a factor in the deterioration of the reliability of the multilayer ceramic capacitor.

To address this, the multilayer ceramic capacitor 1 of the present preferred embodiment has the configuration in which when viewed in the stacking direction T, the positions of some of the thick-walled portions 14M of the plurality of dielectric layers 14 are out of alignment with the positions of the other thick-walled portions 14M. This configuration makes it possible to reduce the thicknesses of raised portions (the inner layer raised portions MN, the multilayer body raised portions MS, and the raised portions M) due to the overlap of the internal electrodes 15 and the ceramic paste 102, that is, enables a reduction of the level difference. As a result, the present preferred embodiment makes it unlikely for the portions other than the raised portions to have a relatively large distortion during the step of pressing the multilayer body and a decrease in the adhesion of the dielectric layers. This feature can reduce or prevent the structural defects such as delamination and microcracks that may be caused by a stress generated during the firing of the multilayer body. As a result, deterioration of the reliability of the multilayer ceramic capacitor 1 can be reduced or prevented.

While the preferred embodiments of the present invention has been described above, the present invention is not limited thereto, and various modifications as described below are possible, for example.

Modifications

Figure 12:
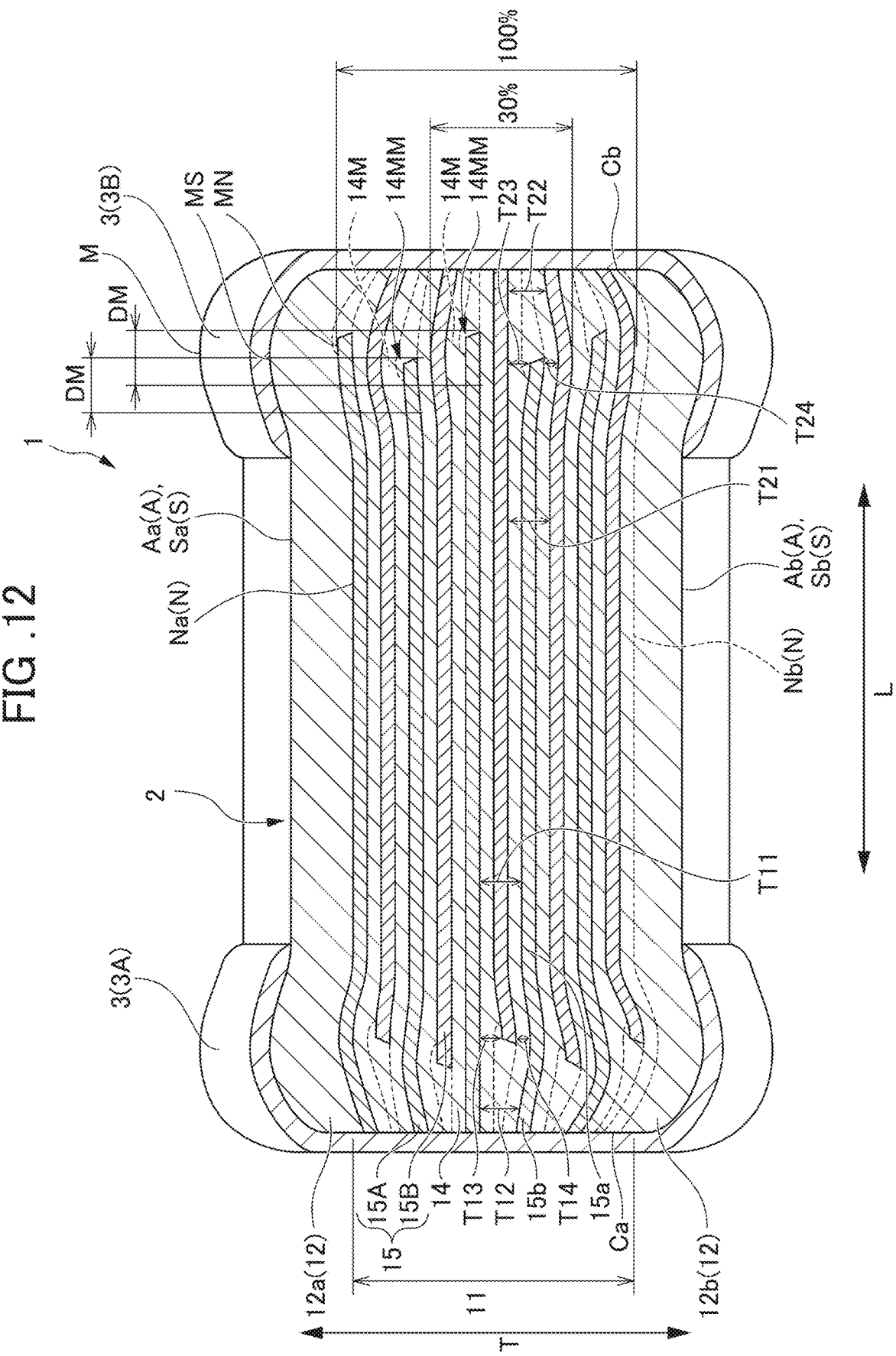
FIG. 12 is a cross-sectional view of a multilayer ceramic capacitor 1 according to a modification of the preferred embodiment of the present invention, taken along a line corresponding to the line II-II in FIG. 1.
Figure 13:
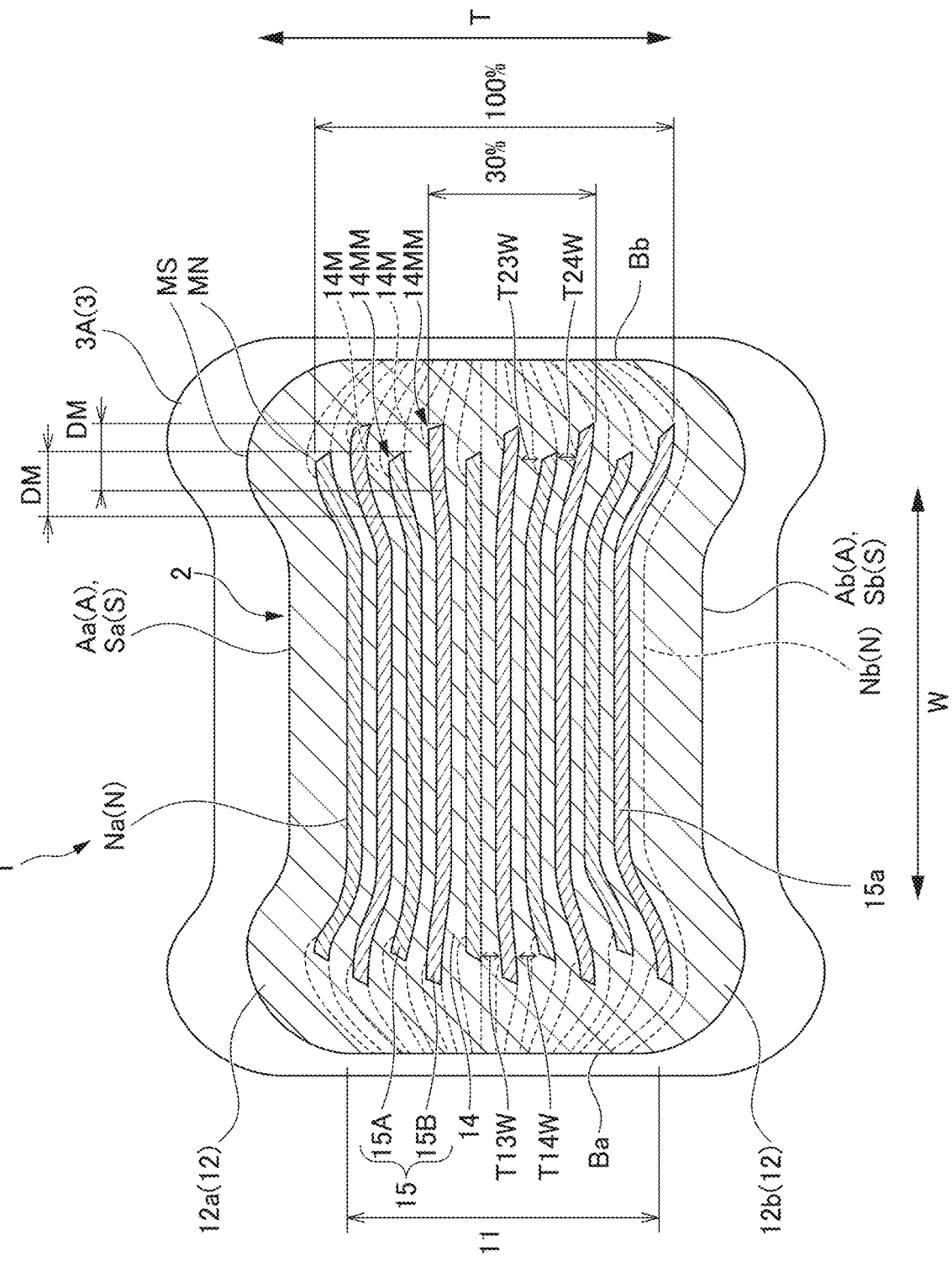
FIG. 13 is a cross-sectional view of the multilayer ceramic capacitor 1 according to the modification of the preferred embodiment of the present invention, taken along a line corresponding to the line III-III in FIG. 1.

FIG. 12 is a cross-sectional view of a multilayer ceramic capacitor 1 according to a modification of a present preferred embodiment of the present invention, taken along a line corresponding to the line II-II in FIG. 1. FIG. 13 is a cross-sectional view of the multilayer ceramic capacitor 1 according to the modification of the present preferred embodiment, taken along a line corresponding to the line III-III in FIG. 1.

The multilayer ceramic capacitor 1 according to the present modification illustrated in FIGS. 12 and 13 has a configuration which corresponds to that of the multilayer ceramic capacitor 1 illustrated in FIGS. 2 and 3, and in which the ceramic paste 102 may be applied thinner than the internal electrode 15.

As illustrated in FIG. 12, the distance between the first internal electrodes 15A and 15A adjacent to each other in the stacking direction T includes a distance T11 and a distance T12. The distance T11 is defined between portions of the adjacent first internal electrodes 15A and 15A that coincide with the second internal electrode 15B in the stacking direction T and correspond in position to the middle portion of the main surface N of the inner layer portion, i.e., the middle portion of the main surface A of the multilayer body. The distance T11 includes the thickness of the second internal electrode 15B. On the other hand, the distance T12 is defined between portions of the adjacent first internal electrodes 15A and 15A that do not coincide with the second internal electrode 15B in the stacking direction T and are in proximity to the first external electrode 3A. The distance T12 includes the thickness of the dielectric layer 14 that is made of the ceramic paste 102 and is thinner than the second internal electrode 15B. Therefore, the distance T11 is greater than the distance T12.

The distance between the second internal electrodes 15B and 15B adjacent to each other in the stacking direction T includes a distance T21 and a distance T22. The distance T21 is defined between portions of the adjacent second internal electrodes 15B and 15B that coincide with the first internal electrode 15A in the stacking direction T and correspond in position to the middle portion of the main surface N of the inner layer portion, i.e., the middle portion of the main surface A of the multilayer body. The distance T21 includes the thickness of the first internal electrode 15A. On the other hand, the distance T22 is defined between portions of the adjacent second internal electrodes 15B and 15B that do not coincide with the first internal electrode 15A in the stacking direction T and are in proximity to the second external electrode 3B. The distance T22 includes the thickness of the dielectric layer 14 that is made of the ceramic paste 102 and is thinner than the first internal electrode 15A. Therefore, the distance T21 is greater than the distance T22.

The above-described distances can be observed with a microscope or a SEM. Alternatively, the distance between the middle portions of the internal electrodes 15 may be determined as follows. A region excluding, from both ends of the internal electrode, portions of about 100 µm or less or portions corresponding to about 10% or less of the widthwise dimension of the internal electrode is divided into five equal segments, and the average of the distances in the five equal segments may be defined as the distance between the middle portions of the internal electrodes 15.

As illustrated in FIG. 12, in the proximity of the first external electrode 3A, the end portion of one second internal electrode 15B is adjacent to, and interposed between, two first internal electrodes 15A in the stacking direction T. The distance between the end portion of the second internal electrode 15B and one of the two first internal electrodes 15A adjacent in the stacking direction T is defined as T13, and the distance between the end portion of the second internal electrode 15B and the other first internal electrode 15A is defined as T14. Due to an imbalance in the presence and absence of the thick-walled portion 14M of each dielectric layer 14, the distance T13 is greater than the distance T14.

In the proximity of the second external electrode 3B, the end portion of one first internal electrode 15A is adjacent to, and interposed between, two second internal electrodes 15B in the stacking direction T. The distance between the end portion of the first internal electrode 15A and one of the two second internal electrodes 15B adjacent in the stacking direction T is defined as T23, and the distance between the end portion of the first internal electrode 15A and the other second internal electrode 15B is defined as T24. Due to an imbalance in the presence and absence of the thick-walled portion 14M of each dielectric layer 14, the distance T23 is greater than the distance T24.

As illustrated in FIG. 13, in the width direction W, the end portion of one second internal electrode 15B is adjacent to, and interposed between, two first internal electrodes 15A in the stacking direction T. The distance between the end portion of the second internal electrode 15B and one of the two first internal electrodes 15A adjacent in the stacking direction T is defined as T13W, and the distance between the end portion of the second internal electrode 15B and the other first internal electrode 15A is defined as T14W. The distance T13W is the same or substantially the same as the distance T14W due to balance in the presence of the thick-walled portion 14M of each dielectric layer 14.

In the width direction W, the end portion of one first internal electrode 15A is adjacent to, and interposed between, two second internal electrodes 15B in the stacking direction T. The distance between the end portion of the first internal electrode 15A and one of the two second internal electrodes 15B adjacent in the stacking direction T is defined as T23W, and the distance between the end portion of the first internal electrode 15A and the other second internal electrode 15B is defined as T24W. The distance T23W is the same or substantially the same as the distance T24W due to balance in the presence of the thick-walled portion 14M of each dielectric layer 14.

Here, as illustrated in FIG. 12, in the proximity of the first external electrode 3A, a difference between the distance T13 and the distance T14 is defined as the distance difference (T13−T14) in the stacking direction. As illustrated in FIG. 13, in the width direction W, a difference between the distance T13W and the distance T14W is defined as the distance difference (T13W−T14W) in the stacking direction. The distance difference (T13−T14) is greater than the distance difference (T13W−T14W).

As illustrated in FIG. 12, in the proximity of the second external electrode 3B, a difference between the distance T23 and the distance T24 is defined as the distance difference (T23−T24) in the stacking direction. As illustrated in FIG. 13, in the width direction W, a difference between the distance T23W and the distance T24W is defined as the distance difference (T23W−T24W) in the stacking direction. The distance difference (T23−T24) is greater than the distance difference (T23W−T24W).

The above-described distances can be observed with a microscope or a SEM. It is suitable that the above-described distances are each the distance between the respective ends of the internal electrodes, i.e., the distance measured at the respective thickest portion 14MM of the thick-walled portion 14M.

The thickness of the ceramic paste may be, for example, about 40% or more and about 90% of less of the thickness of the internal electrode 15. The distance difference (T13−T14) and the distance difference (T23−T24) each correspond to the thickness of a single layer of the ceramic paste. Accordingly, each of the distance difference (T13−T14) and the distance difference (T23−T24) is, for example, about 40% or more and about 90% of less of the thickness of the internal electrode 15.

As described above, the thickness of the internal electrode is, for example, about 0.2 µm or more and about 0.6 µm or less, and preferably about 0.2 µm or more and about 0.4 µm or less. As described above, the number of the internal electrodes 15 is preferably, for example, 15 or more and 200 or less. From the viewpoint of achieving a large capacity, the number of the internal electrodes 15 is further preferably, for example, about 20 or more and about 2,000 or less.

In this case, if the ceramic paste 102 is provided to all of the internal electrodes 15, it is possible that the raised portions (the inner layer raised portions MN, the multilayer body raised portions MS, and the raised portions M) due to the overlap of the internal electrodes 15 and the ceramic paste 102 can increase in thickness. That is, the level difference can increase.

In this regard, it is conceivable to provide the ceramic paste to only some of the internal electrodes 15. For example, in the stacking direction T, when the region including all of the plurality of internal electrodes is defined as 100%, in a region located in a middle portion in the stacking direction T and defining about 30%, the distance difference (T13−T14) is greater than the distance difference (T13W−T14W), and the distance difference (T23−T24) is greater than the distance difference (T23W−T24W).

This configuration makes it possible to further reduce the thicknesses of the raised portions (the inner layer raised portions MN, the multilayer body raised portions MS, and the raised portions M) due to the overlap of the internal electrodes 15 and the ceramic paste 102, i.e., the level differences.

As a result, the above configuration makes it even more unlikely for the portions other than the raised portions to have a relatively large distortion during the step of pressing the multilayer body and a decrease in the adhesion of the dielectric layers. This makes it possible to reduce or prevent structural defects such as delamination and microcracks that can be caused by a stress generated during the firing of the multilayer body. Thus, deterioration of the reliability of the multilayer ceramic capacitor 1 can be further reduced or prevented.

In the preferred embodiments and the modifications described above, the thick-walled portions 14M of the dielectric layers 14 are provided at the locations coincident with both end portions in the width direction W (widthwise end portions) of the internal electrodes 15 (FIG. 3), and at the locations coincident with both end portions in the length direction L (lengthwise end portions) of the internal electrodes 15 (FIG. 2). However, the present invention is not limited to this. The thick-walled portions 14M of the dielectric layers 14 may be provided at the locations coincident with both end portions in the width direction W (widthwise end portions) of the internal electrodes 15 (FIG. 3), or at the locations coincident with both end portions in the length direction L (lengthwise end portions) of the internal electrodes 15 (FIG. 2).

For example, there is a process of fabricating a multilayer ceramic capacitor, according to which a dielectric is provided at the side gaps on side surfaces B (Ba, Bb) of the multilayer body 2 in a later step. When this process is used, it is unnecessary to apply the ceramic paste 102 to fill the level difference caused by the internal electrode patterns in a direction corresponding to the width direction W of the multilayer body 2. As a result, the sites coincident with both end portions in the width direction of the internal electrodes are not provided with the thick-walled portions 14M of the dielectric layers 14. In addition, both widthwise end portions of the internal electrodes are aligned or substantially aligned (for example, substantially aligned to a tolerance of about 5 μm). Even in this case, the thick-walled portions 14M of the dielectric layers 14 may be provided at the locations coincident with both lengthwise end portions of the internal electrodes 15. Furthermore, when viewed in the stacking direction T, positions of the thick-walled portions 14M coincident with the lengthwise end portions of the internal electrodes 15 may be out of alignment in the length direction L.

EXAMPLES

In the following, preferred embodiments of the present invention will be described more specifically, based on examples. The following examples are not intended to limit the present invention.

Example 1

The multilayer ceramic capacitors of the preferred embodiments illustrated in FIGS. 1 to 3 were fabricated as Example 1. The specifics of the configuration of the multilayer ceramic capacitor of Example 1 were as follows.

The thickness of the dielectric layer 14 (in a portion corresponding in position to the of middle portion of the multilayer body's main surface A) was about 0.6 μm.

The thickness of the internal electrode 15 was about 0.6 μm.

The number of the dielectric layers 14 in the inner layer portion 11, i.e., the number of the internal electrodes 15 in the inner layer portion 11 was 400.

The thickness of the outer layer portions 12 was about 20 μm.

The width of the side gap (width from the end of the internal electrode to the side surface B of the multilayer body in FIG. 3) was about 15 μm.

The thickness of the thick-walled portion 14M of the dielectric layer 14 was as shown in Table 1.

The internal electrodes 15 were stacked such that the widthwise end portions of the internal electrodes 15 adjacent to each other in the stacking direction T were out of alignment with each other in the width direction W, such that the position of the thick-walled portions 14M adjacent to each other in the stacking direction T were out of alignment with each other in the width direction W. The lengthwise end portions of the first internal electrodes 15A adjacent to each other in the stacking direction T were out of alignment with each other in the length direction L, and the lengthwise end portions of the second internal electrodes 15B adjacent to each other in the stacking direction T were out of alignment with each other in the length direction L, such that the positions of the thick-walled portions 14M adjacent to each other in the stacking direction T were out of alignment with each other in the length direction L. Furthermore, as illustrated in FIGS. 12 and 13, the ceramic paste 102 was applied in a thickness of about 60% of the thickness of the internal electrode.

Examples 2 to 4

The multilayer ceramic capacitors of Examples 2 to 4 were different from that of Example 1 in the thickness of the thick-walled portion 14M of the dielectric layer 14. The thicknesses of the thick-walled portions 14M of Examples 2 to 4 are shown in Table 1.

Comparative Example 1

The multilayer ceramic capacitor of Comparative Example 1 was different from that of Example 1 in the thickness of the thick-walled portion of the dielectric layer. The thickness of the thick-walled portion of Comparative Example 1 is shown in Table 1.

Comparative Example 2

The multilayer ceramic capacitor of Comparative Example 2 was different from that of Example 1 in that the dielectric layers of the multilayer ceramic capacitor of Comparative Example 2 did not have the thick-walled portions, that is, Comparative Example 2 did not include the ceramic paste.

To form the thick-walled portions 14M of the dielectric layers 14 having different thicknesses, the ceramic paste 102 was printed using screen printing plates having different thickness.

Evaluation

Here, as described above, an increase in the thickness of the raised portions formed by the overlap of the internal electrodes 15 and the ceramic paste 102, i.e., an increase in the level difference is considered to result in a problem similar to the above-described problem caused by the level difference between a location with an internal electrode and a location without an internal electrode. That is, in the portions other than the raised portions, a relatively large distortion occurs during the step of pressing the multilayer body, and the dielectric layers have a relatively low adhesion, such that structural defects such as delamination and microcracks may be caused by a stress generated during the firing of the multilayer body. Such structural defects are a factor in the deterioration of the reliability of the multilayer ceramic capacitor.

In view of the foregoing, a highly accelerated limit test (HALT) was conducted to test the reliability of the multilayer ceramic capacitors of the examples and comparative examples. The HALT is a test in which a test target is subjected to stresses such as temperature and vibration exceeding the specifications of the test target, thus determining the operating limit and/or destructive limit, or in other words, the operating margin and/or destructive margin with respect to the specifications. The HALT is an accelerated test and/or destructive tests. The HALT allows testing of margins with respect to the specifications of a test target, i.e., reliability of the test target, in a short period of time. The HALT was conducted under the conditions shown in Table 1. The evaluation was made based on the number of test targets experiencing initial failure with no margin for required specifications, out of 100 test targets. The evaluation results are represented as "Good" when the number of the test targets experiencing the initial failure was two or less, and as "Fail" when the number of the test targets experiencing the initial failure was three or more.

TABLE 1

|  | Thickness of Thick-Walled Portion (um) | Conditions of HALT (Temperature of 150° C., Voltage of 6 V, Duration of 200 hours) | Evaluation |
|---|---|---|---|
| Example 1 | 0.78 | Number of test targets experiencing initial failure: 0/100 | Good |
| Example 2 | 0.73 | Number of test targets experiencing initial failure: 0/100 | Good |
| Example 3 | 0.68 | Number of test targets experiencing initial failure: 0/100 | Good |
| Example 4 | 0.63 | Number of test targets experiencing initial failure: 2/100 | Good |
| Comparative Example 1 | 0.60 | Number of test targets experiencing initial failure: 3/100 | Fail |
| Comparative Example 2 | nil | Number of test targets experiencing initial failure: 8/100 | Fail |

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a multilayer body including a plurality of dielectric layers and a plurality of internal electrodes alternately stacked on one another, two main surfaces facing each other in a stacking direction, two end surfaces facing each other in a length direction orthogonal or substantially orthogonal to the stacking direction, and two side surfaces facing each other in a width direction orthogonal or substantially orthogonal to the stacking direction and the length direction; and
two external electrodes respectively on the two end surfaces of the multilayer body; wherein
each of the plurality of dielectric layers includes, at a location coincident with an end portion of a respective one of the internal electrodes, a thick-walled portion thicker in the stacking direction than a portion of the dielectric layer corresponding in position to a middle portion of the main surface; and
when viewed in the stacking direction, positions of some of the thick-walled portions of the plurality of dielectric layers are out of alignment with positions of a remainder of the thick-walled portions of the plurality of dielectric layers.

2. The multilayer ceramic capacitor according to claim 1, wherein the thick-walled portions include thick-walled portions which are adjacent to each other in the stacking direction and which are out of alignment with each other when viewed in the stacking direction.

3. The multilayer ceramic capacitor according to claim 1, wherein
the end portions of the internal electrodes are end portions in the width direction; and
the positions of the thick-walled portions are out of alignment with each other in the width direction.

4. The multilayer ceramic capacitor according to claim 3, wherein each of the thick-walled portions has a band shape having a width of about 10 μm to about 80 μm in the width direction from an end of the respective one of the internal electrodes, and extends in the length direction.

5. The multilayer ceramic capacitor according to claim 1, wherein
the end portions of the internal electrodes are end portions in the length direction; and
the positions of the thick-walled portions are out of alignment with each other in the length direction.

6. The multilayer ceramic capacitor according to claim 5, wherein each of the thick-walled portions has a band shape having a width of about 10 μm to about 80 μm in the length direction from an end of the respective one of the internal electrodes, and extends in the width direction.

7. The multilayer ceramic capacitor according to claim 1, wherein each thick-walled portion includes a thickest portion that is thicker than any other portion of the thick-walled portion, and a position of the thickest portion is defined as the position of the thick-walled portion.

8. The multilayer ceramic capacitor according to claim 1, wherein the position of each of the thick-walled portions is coincident with an end of the respective one of the internal electrodes.

9. The multilayer ceramic capacitor according to claim 1, wherein each thick-walled portion includes a thickest portion that is thicker than any other portion of the thick-walled portion, and the thickest portion is about 1.05 times to about 1.30 times as thick as a portion of the dielectric layer corresponding in position to the middle portion of the main surface.

10. The multilayer ceramic capacitor according to claim 1, wherein the multilayer body includes an inner layer portion including the plurality of internal electrodes, and outer layer portions sandwiching the inner layer portion in the stacking direction and not including the plurality of internal electrodes.

11. The multilayer ceramic capacitor according to claim 1, wherein the multilayer body has a dimension in the length direction of about 0.2 mm to about 10 mm, a dimension in the width direction W of about 0.1 mm to about 10 mm, and a dimension in the stacking direction T of about 0.1 mm to about 5 mm.

12. The multilayer ceramic capacitor according to claim 1, wherein each of the plurality of internal electrodes includes at least one of Ni, Cu, Ag, Pd, Ag—Pd alloy, or Au.

13. The multilayer ceramic capacitor according to claim 1, wherein a number of the plurality of internal electrodes is 15 to 2000.

14. The multilayer ceramic capacitor according to claim 1, wherein each of the plurality of dielectric layers includes $BaTiO_3$ as a main component.

15. The multilayer ceramic capacitor according to claim 14, wherein each of the plurality of dielectric layers includes at least one of a Mn compound, a Fe compound, a Cr compound, a Co compound, a Ni compound, or a rare earth.

16. The multilayer ceramic capacitor according to claim 1, wherein an interface layer is disposed between each of the plurality of dielectric layers and respective ones of the plurality of internal electrode layers.

17. The multilayer ceramic capacitor according to claim 16, wherein the interface layer includes Sn.

18. The multilayer ceramic capacitor according to claim 1, wherein a number of the plurality dielectric layers is 15 to 2000.

\* \* \* \* \*